United States Patent

Ritsema

Patent Number: 4,540,068
Date of Patent: Sep. 10, 1985

[54] DISC BRAKE

[75] Inventor: Irving R. Ritsema, South Bend, Ind.

[73] Assignee: Allied Corporation, Morristown, N.J.

[21] Appl. No.: 468,241

[22] Filed: Feb. 22, 1983

[51] Int. Cl.³ .............................................. F16D 65/20
[52] U.S. Cl. ............................... 188/73.39; 188/73.45;
  188/71.8; 188/72.3; 188/196 P
[58] Field of Search ............... 188/73.39, 73.43, 73.44,
  188/73.45, 73.47, 73.32, 73.41, 73.31, 71.1, 72.1,
  72.4, 71.8, 72.3, 196 P, 370

[56] References Cited

U.S. PATENT DOCUMENTS

| | | | |
|---|---|---|---|
| 3,499,508 | 3/1970 | Swift | 188/73 |
| 3,552,527 | 1/1971 | Hayes | 188/73.3 |
| 3,602,328 | 8/1971 | Fannin | 188/72.5 |
| 3,612,225 | 10/1971 | Evans | 188/72.6 |
| 3,618,714 | 10/1971 | Croswell | 188/71.8 |
| 3,884,332 | 5/1975 | Walther et al. | 188/73.43 |
| 3,887,045 | 6/1975 | DeHoff et al. | 188/73.47 X |
| 3,958,668 | 5/1975 | Kestermeier et al. | 188/73.4 |
| 3,970,172 | 7/1976 | De Gennes | 188/73.4 |
| 3,973,652 | 8/1976 | Shimizu et al. | 188/73.47 X |
| 3,980,160 | 9/1976 | Hoffmann et al. | 188/73.5 |
| 4,261,443 | 4/1981 | Wright | 188/73.39 |
| 4,369,862 | 1/1983 | Seki | 188/73.45 |
| 4,373,616 | 2/1983 | Kondo | 188/73.32 X |
| 4,476,962 | 10/1984 | Bofill | 188/71.1 |

FOREIGN PATENT DOCUMENTS

| | | |
|---|---|---|
| 0083881 | 7/1983 | European Pat. Off. . |
| 1468926 | 2/1967 | France . |
| 2264221 | 10/1975 | France . |
| 2284800 | 4/1976 | France . |
| 2309758 | 11/1976 | France . |
| 2367221 | 5/1978 | France . |
| 0142464 | 11/1979 | Japan .................. 188/73.44 |
| 1160534 | 8/1969 | United Kingdom . |
| 2065248 | 6/1981 | United Kingdom . |
| 2120330 | 11/1983 | United Kingdom . |

Primary Examiner—George E. A. Halvosa
Assistant Examiner—Michael P. Gilday
Attorney, Agent, or Firm—Larry J. Palguta; Ken C. Decker

[57] ABSTRACT

A disc brake includes a caliper assembly with a reaction leg and an actuation leg on opposite sides of a rotor. The caliper assembly includes a pair of end bridges and an integrally formed center bridge to connect the legs together and substantially prevent deflection between the legs.

17 Claims, 3 Drawing Figures

DISC BRAKE

This invention relates to a disc brake wherein a caliper assembly cooperates with a pair of brake pads to urge the latter into engagement with a disc during braking. A torque member movably supports the caliper assembly.

In a chordal disc brake such as illustrated in U.S. Pat. No. 3,970,172, issued July 20, 1976, the caliper is movably carried relative to a torque member. The caliper is made of two parts. One part is a flat plate with a central opening receiving a pair of brake pads and also receiving the rotor to be braked. The second part is a cylinder forming a hydraulic actuator. With a chordal disc brake, it is necessary to make the caliper from two parts as the cylinder requires boring to form a smooth surface sealingly receiving a piston, and the plate does not provide sufficient space to receive a boring bit facing the hydraulic actuator part of the caliper. Furthermore, when the central opening is large enough to receive the pair of brake pads, the part of the caliper opposite from the hydraulic actuator acts as a beam to urge one of the pads into the rotor during braking and the beam part of the caliper is subjected to large loads which tend to deflect the caliper resulting in uneven brake pad wear and fluid displacement during braking.

The present invention provides a disc brake comprising a caliper assembly cooperating with a pair of brake pads to selectively engage the latter with a disc to be braked and the caliper assembly being adapted for axial movement relative to a torque member during braking, the caliper assembly including an actuation leg on one side of the disc carrying a hydraulic actuator operable to directly engage one of the pair of brake pads with the disc and impart axial movement to the caliper assembly, the caliper assembly including a reaction leg on the other side of the disc urging the other brake pad into engagement with the disc, and the caliper assembly including a pair of end bridges at the circumferential extremities thereof and extending over the disc in order to connect the actuation leg with the reaction leg, characterized by said caliper assembly further including an integrally formed center bridge separate from said pair of end bridges and extending over said disc to further connect said actuation leg with said reaction leg, said center bridge cooperating with said reaction leg to render the same substantially rigid whereby said center bridge opposes deflection of said reaction leg during braking.

It is an advantage of the present invention that caliper deflection is reduced so that the fluid required for full braking is less than normally required. Therefore, brake pedal travel during a full brake application is also reduced.

The invention will now be described with reference to the accompanying drawings, wherein.

Figure 1:
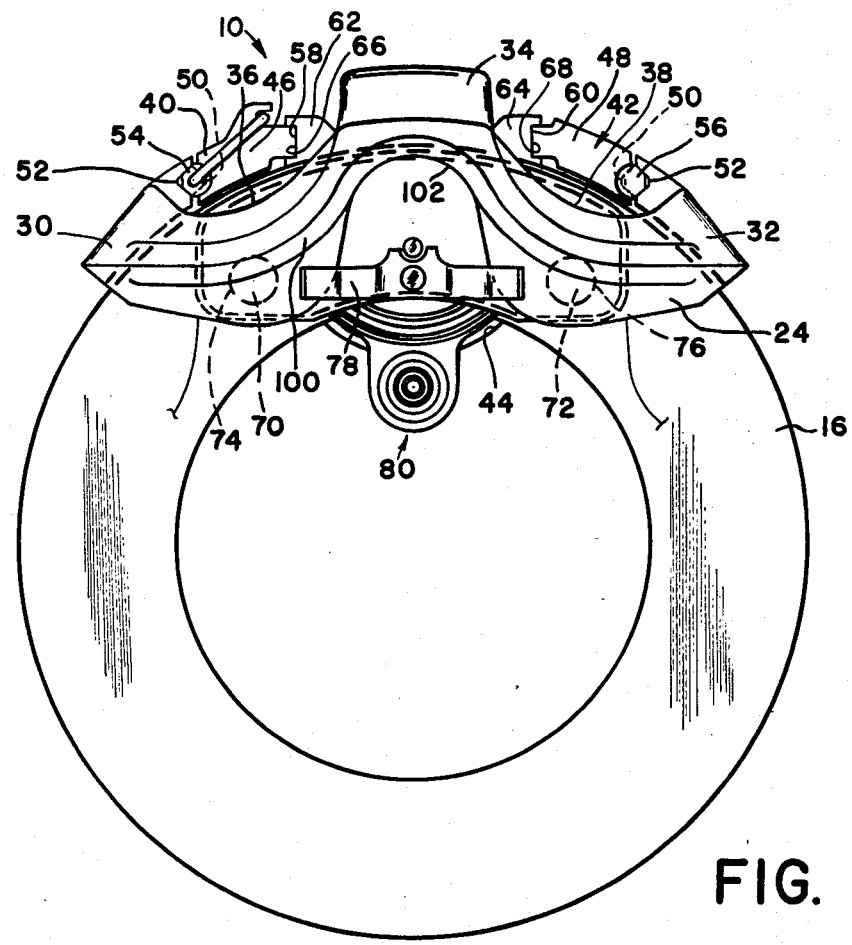
FIG. 1 is an end view of a disc brake constructed in accordance with the present invention.
Figure 2:
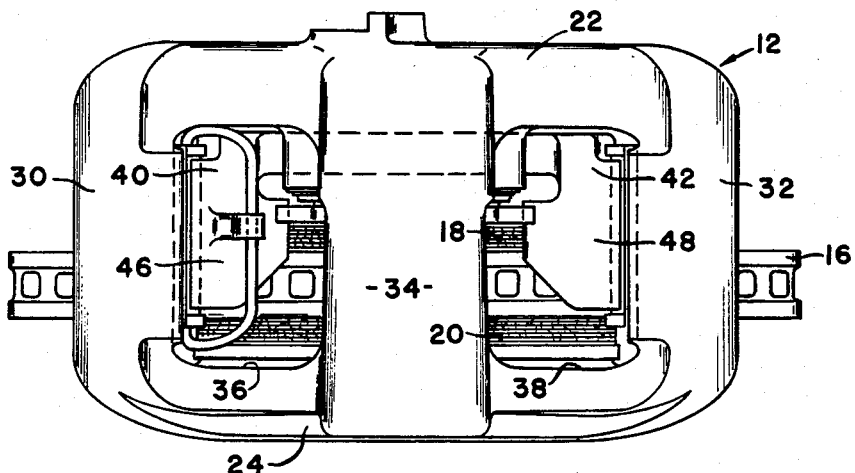
FIG. 2 is a top view of FIG. 1.

A disc brake 10 comprises a caliper assembly 12 movably carried by a torque member 14 in juxtaposition a rotor 16 to be braked. The caliper assembly 12 cooperates with a pair of brake pads 18 and 20 to urge the latter into engagement with the rotor during a brake application.

The caliper assembly 12 defines an actuation leg 22 on one side of the rotor 16 and a reaction leg 24 on the other side of the rotor 16. The actuation leg 22 defines a bore 26 for movably receiving a piston 28 in a conventional sealing relationship so that fluid pressure received in the bore imparts movement to the piston 28. In order to connect the actuation leg 22 with the reaction leg 24, the caliper assembly includes three integrally formed bridges extending over the outer periphery of the rotor. A pair of end bridges 30 and 32 are separate from a center bridge 34. The end bridge 30 cooperates with the center bridge 34 to form a first aperture 36 on the caliper assembly and the end bridge 32 cooperates with the center bridge 34 to form a second aperture 38.

The torque member 14 includes a pair of arms 40 and 42 extending radially outward to positions above the periphery of the rotor and into the respective apertures 36 and 38. The pair of arms 40 and 42 form an opening 44 therebetween and the actuation leg 22 of the caliper assembly is disposed therein. The torque member further includes a pair of flanges 46 and 48 extending transversely from the pair of arms 40 and 42, respectively. The pair of flanges 46 and 48 are confined to the apertures 36 and 38 and each flange defines a transversely extending slot 50 opposing a matching slot 52 in each end bridge 30 and 32. A pair of keys 54 and 56 are inserted into the slots 50 and 52 to provide a sliding support for the caliper assembly relative to the torque member. The flanges 46 and 48 form abutments 58 and 60 opposite from the slots 50 and the brake pad 18 includes outwardly extending fingers 62 and 64 with recesses 66 and 68, respectively, receiving the abutments 58 and 60. Consequently, the brake pad 18 which is the inner pad is carried by the torque member so that torque developed during braking by the inner pad is transmitted directly to the torque member via abutment 58 or 60, depending on the direction of rotation for the rotor 16. The brake pad 20 includes a pair of tabs 70 and 72 extending into a pair of recesses 74 and 76 and a plate spring 78 yieldably retains the tabs in the recesses. Torque developed by brake pad 20 which is the outer pad is transmitted to the caliper assembly 12, and more particularly, the reaction leg 24, so that the end bridges 30 and 32 are urged into abutment with the torque member flanges 40 and 42. If the rotor is rotating in a clockwise direction in FIG. 1, the inner pad will abut abutment 60 on flange 42 while the caliper assembly will urge end bridge 30 into abutment with flange 40 via key 54. Therefore, the torque transferred to the torque member 14 is split between the flanges 40 and 42.

Figure 3:
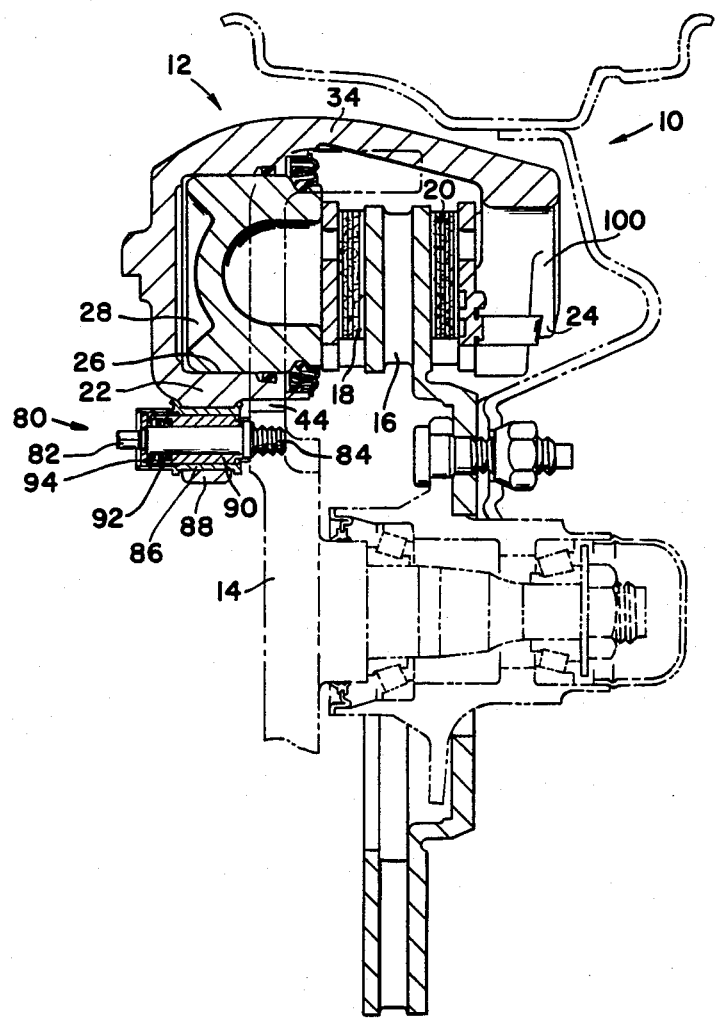
FIG. 3 is a center cross sectional view of the disc brake of FIG. 1.

With the pair of keys engaging the torque member and the caliper assembly over a substantial axial dimension, it is possible for the caliper assembly to remain in an applied position upon termination of braking. This undesirable situation causes the outer pad 20 to remain in light engagement ith the rotor causing brake drag. In order to overcome this situation, a retraction pin assembly 80 is disposed between the actuation leg 22 of the caliper assembly 12 and the torque member 14. The pin assembly 80 comprises a pin 82 threadably secured to the torque member 14 via aperture 84, a resilient tube 86 fixedly carried by a leg 88 on the actuation leg 22, a sleeve 90 disposed within the tube 86, and a spring 92 between the pin 82 and the sleeve 90. The sleeve 90 defines a spacing 94 with the pin 82 when the brake is in a rest position. During braking, the actuation leg 22 and tube 86 move to the left in FIG. 3. The tube 86 and sleeve 90 defining a gripping engagement therebetween, so that the sleeve 90 moves with the tube to contract spring 92 through the dimension of the spacing 94. If the brake pads wear, the tube 86 can overcome the gripping engagement and move relative to the sleeve. Upon termination of braking, the spring 92 biases the sleeve and tube to move positively through a distance equal to the spacing 94 to disengage the outer pad from the rotor, while a piston retraction seal associated with the piston 28 releases the inner pad from its engagement with the rotor.

Viewing FIG. 1, the reaction leg 24 defines a reinforcing rib 100 extending transversely from end bridge 30 to end bridge 32. The reinforcing rib extends upwardly at a central location between the end bridges at the center bridge 34 to form a part of the boundary for a central recess 102. The central recess extends radially outward to the outer periphery of the rotor 16 to permit a tool (not shown) to fit therein for machining the bore 26 on the actuation leg of the caliper. The edges of the apertures 36 and 38 extend radially inward between the bridges 30–34 to a location radially inside the outer periphery of the rotor. The reinforcing rib 100 extends between the boundary of the central recess 102 and the edges of the apertures 36 and 38 and cooperates with the center bridge 34 to render the reaction leg 24 rigid. As a result, when the caliper assembly is biasing the pair of brake pads into engagement with the rotor, the reaction forces biasing the reaction leg to separate from, or deflect away from, the actuation leg will be substantially negated. The reaction leg will retain its structural dimensions to prevent uneven lining wear for the outer pad 20 as well as reduce stress concentrations at the connections between the reaction leg and the bridges.

I claim:

1. A disc brake comprising a caliper assembly cooperating with a pair of brake pads to selectively engage the latter with a disc to be braked and the caliper assembly being adapted for axial movement relative to a torque member during braking, the caliper assembly including an actuation leg on one side of the disc carrying a hydraulic actuator operable to directly engage one of the pair of brake pads with the disc and impart axial movement to the caliper assembly, the caliper assembly including a reaction leg on the other side of the disc urging the other brake pad into engagement with the disc, and the caliper assembly including a pair of end bridges at the circumferential extremities thereof and extending over the disc in order to connect the actuation leg with the reaction leg, characterized by said caliper assembly further including an integrally formed center bridge separate from said pair of end bridges and extending over said disc to further connect said actuation leg with said reaction leg, said center bridge cooperating with said reaction leg to render the same substantially rigid whereby said center bridge opposes deflection of said reaction leg during braking, said center bridge cooperating with said pair of end bridges to define a pair of openings on opposite circumferential sides of said center bridge, the reaction leg defining a single central recess opposite said hydraulic actuator which are both aligned with said center bridge, and a reinforcing rib on the reaction leg extending axially away from said disc and said reaction leg, said reinforcing rib forming a portion of a boundary of said central recess.

2. A disc brake comprising a caliper assembly cooperating with a pair of brake pads to selectively engage the latter with a disc to be braked and the caliper assembly being adapted for axial movement relative to a torque member during braking, the caliper assembly including an actuation leg on one side of the disc carrying a hydraulic actuator operable to directly engage one of the pair of brake pads with the disc and impart axial movement to the caliper assembly, the caliper assembly including a reaction leg on the other side of the disc urging the other brake pad into engagement with the disc, and the caliper assembly including a pair of end bridges at the circumferential extremities thereof and extending over the disc in order to connect the actuation leg with the reaction leg, characterized by said caliper assembly further including an integrally formed center bridge separate from said pair of end bridges and extending over said disc to further connect said actuation leg with said reaction leg, said center bridge cooperating with said reaction leg to render the same substantially rigid whereby said center bridge opposes deflection of said reaction leg during braking, said center bridge cooperating with said pair of end bridges to define a pair of openings on opposite circumferential sides of said center bridge, the torque member extending into said pair of openings to oppose said pair of end bridges and one of said pair of brake pads extending into said pair of openings to oppose said torque member therein, said torque member defining a pair of arms disposed in said pair of openings, each of said pair of arms defining circumferentially outwardly facing axial recesses cooperating with said pair of end bridges, respectively, to carry axially keys therebetween which movably support said caliper relative to said torque member, and said pair of arms also extend radially inwardly on opposite sides of said center bridge at intermediate locations to a radial dimension less than a radial dimension for the disc and said reaction leg extends radially outwardly from said intermediate locations to said pair of end bridges.

3. The disc brake in accordance with claim 1, further comprising a pin assembly extending between the torque member and caliper assembly, the pin assembly assisting in movably supporting the caliper assembly relative to the torque member.

4. The disc brake in accordance with claim 3, wherein the pin assembly is disposed only on one side of the torque member.

5. The disc brake in accordance with claim 3, wherein the pin assembly comprises a retraction pin assembly which returns the caliper assembly to an initial position at which the other brake pad is disengaged from the disc.

6. The disc brake in accordance with claim 5, wherein the retraction pin assembly comprises a pin secured to the torque member, a sleeve disposed about the pin, a tube carried by the caliper assembly and disposed about the sleeve, and resilient means between the pin and sleeve.

7. The disc brake in accordance with claim 6, wherein the tube and sleeve define a releasable gripping engagement therebetween which releases to allow the tube to move relative to the sleeve as a function of brake pad wear.

8. The disc brake in accordance with claim 1, wherein the torque member comprises a pair of arms extending into the opening to carry keys between the arms and end bridges and movably carry the caliper assembly relative to the torque member.

9. The disc brake in accordance with claim 8, wherein the keys extend axially from one side of the disc to the other side of the disc.

10. The disc brake in accordance with claim 8, wherein the arms support the one brake pad to prevent movement during braking.

11. The disc brake in accordance with claim 2, further comprising a pin assembly extending between the torque member and caliper assembly, the pin assembly cooperating with the keys to movably support the caliper assembly relative to the torque member.

12. The disc brake in accordance with claim 11, wherein the pin assembly is disposed only on one side of the torque member.

13. The disc brake in accordance with claim 11, wherein the pin assembly comprises a retraction pin assembly which returns the caliper assembly to an initial position at which the other brake pad is disengaged from the disc.

14. The disc brake in accordance with claim 13, wherein the retraction pin assembly comprises a pin secured to the torque member, a sleeve disposed about the pin, a tube carried by the caliper assembly and disposed about the sleeve, and resilient means between the pin and sleeve.

15. The disc brake in accordance with claim 14, wherein the tube and sleeve define a releasable gripping engagement therebetween which releases to allow the tube to move relative to the sleeve as a function of brake pad wear.

16. The disc brake in accordance with claim 2, wherein the keys extend axially from one side of the disc to the other side of the disc.

17. The disc brake in accordance with claim 16, wherein the arms support the one brake pad to prevent movement during braking.

* * * * *